United States Patent [19]
Holland

[11] Patent Number: 4,853,189
[45] Date of Patent: Aug. 1, 1989

[54] APPARATUS FOR CONVERSION OF OILS TO HYDROCARBON PRODUCTS

[75] Inventor: Floyd H. Holland, Borger, Tex.

[73] Assignee: Phillips Petroleum Company, Bartlesville, Okla.

[21] Appl. No.: 6,084

[22] Filed: Jan. 23, 1987

[51] Int. Cl.[4] .............................................. B01J 8/18
[52] U.S. Cl. ................... 422/140; 196/126; 196/127; 196/128; 196/135; 422/139; 422/142; 422/145; 422/214
[58] Field of Search ............... 422/139, 140, 142, 144, 422/145, 147, 214; 196/126–128, 135; 203/DIG. 6

[56] References Cited

U.S. PATENT DOCUMENTS

| 1,613,124 | 1/1927 | Owens | 196/128 X |
| 1,677,772 | 7/1928 | Herthel et al. | 196/126 X |
| 2,666,734 | 1/1954 | Findlay | 196/127 X |
| 4,331,533 | 5/1982 | Dean et al. | 208/113 |
| 4,434,049 | 2/1984 | Dean et al. | 208/153 |
| 4,562,046 | 12/1985 | Hays et al. | 422/140 |

OTHER PUBLICATIONS

Burgess-Manning Bulletin 3300.
Chemical Engineer's Handbook (4th. Ed.), pp. 9-26 and 9-27.

Primary Examiner—Barry S. Richman
Assistant Examiner—Amalia L. Santiago
Attorney, Agent, or Firm—Laney, Dougherty, Hessin & Beavers

[57] ABSTRACT

Process and apparatus for catalytic conversion of oils. A furnace heats a feedstock which is provided to a separator for separation of the feedstock into a gas vapor phase and a liquid phase. The liquid phase is provided under pressure to a venturi nozzle which atomizes the liquid oil. The atomized oil and the gas are each provided to a reactor such as the lower end of a riser reactor in a fluid catalytic cracking unit.

19 Claims, 2 Drawing Sheets

APPARATUS FOR CONVERSION OF OILS TO HYDROCARBON PRODUCTS

BACKGROUND AND SUMMARY OF THE INVENTION

The instant invention pertains to the conversion of an oil feedstock to hydrocarbon products. In one aspect, the invention relates to catalytic cracking wherein a feedstock stream and catalyst are contacted in a reactor.

It is known that atomization of an oil feedstock stream for mixing with catalyst enhances many reactions. This is so because increased atomization increases the surface area of the oil and thereby increases heat transfer to the oil. Such heat transfer first vaporizes and thereafter drives the catalytic reactions.

Atomization of the oil as it enters the riser reactor in a fluid catalytic cracking unit is particularly important when converting heavy oils which have an initial boiling point generally in the temperature range of 600° F. to 1200° F. Heavy oils are especially difficult to crack to valuable products because their high boiling point and viscosity make satisfactory vaporization very difficult.

Heavy oils can be successfully cracked into desirable products where they have been vaporized prior to contact with the catalyst. With conventional feeds, vaporization is achieved by radiant energy transfer from the hot cracking catalyst to the feed droplets. This type of vaporization mechanism is satisfactory for oils that are vaporized below thermal cracking temperatures which commence at about 850° F. For heavy oils, however, vaporization may not be completed prior to the onset of thermal cracking and coke formation. Further, coke laydown is worsened where liquid oil strikes the hot catalyst particles. An apparatus and process for vaporizing a heavy oil would clearly be desirable.

It is common to pre-heat an oil feedstock in order to enhance vaporization and cracking of the oil in a fluid catalytic cracking unit. When the feedstock is so heated, some of the oil is vaporized prior to its introduction to a nozzle for atomization. Thus, the feedstock stream may comprise a two phase flow consisting of steam and oil vapor, on one hand, and liquid oil when it is injected into the nozzle for atomization. Atomization of two phase fluids increases nozzle wear. Also, nozzle atomization of a two phase fluid results in less efficient atomization than when a single liquid phase is introduced to the nozzle. Further, slugs of liquid and gas emitted from the nozzle can momentarily disrupt the catalyst-oil ratio in the unit, changing product distribution. It would be clearly desirable to provide an apparatus and process in which the liquid phase of a two phase hydrocarbon feedstock stream may be fully atomized when it is introduced to the riser reactor of a fluid catalytic cracking unit.

It is an object of the present invention to provide an apparatus and process for atomizing an oil feed for catalytic conversion.

It is another object of the invention to provide such an apparatus and process in which the liquid oil in a two phase feedstock stream is atomized into vapor and tiny droplets when introduced into a reactor for catalytic conversion.

It is another specific object of the invention to provide such an apparatus and process in which wear on the oil nozzle used to introduce liquid oil into a reactor for catalytic conversion is substantially reduced.

It is still another object of the present invention to provide such an apparatus and process which permits use of a shorter riser reactor and/or increases cracking yields and/or a reduces the severity of catalytic cracking unit operating conditions.

In one aspect, the invention comprises a process for catalytic conversion of hydrocarbons in which an oil feedstock is separated into vapor and liquid components. Thereafter, each of the separated components is separately introduced into a reactor for catalytic conversion. The process may include the steps of heating the feedstock prior to separation into vapor and liquid components and mixing the feedstock with steam prior to heating of the feedstock. In another aspect of the invention, the liquid component is atomized prior to introducing the same into a reactor for catalytic conversion. The atomization may be achieved by providing a liquid component under pressure to the throat of a venturi atomizer.

In yet another aspect of the invention, apparatus is provided for performing the process.

DETAILED DESCRIPTION OF THE INVENTION

Figure 1:
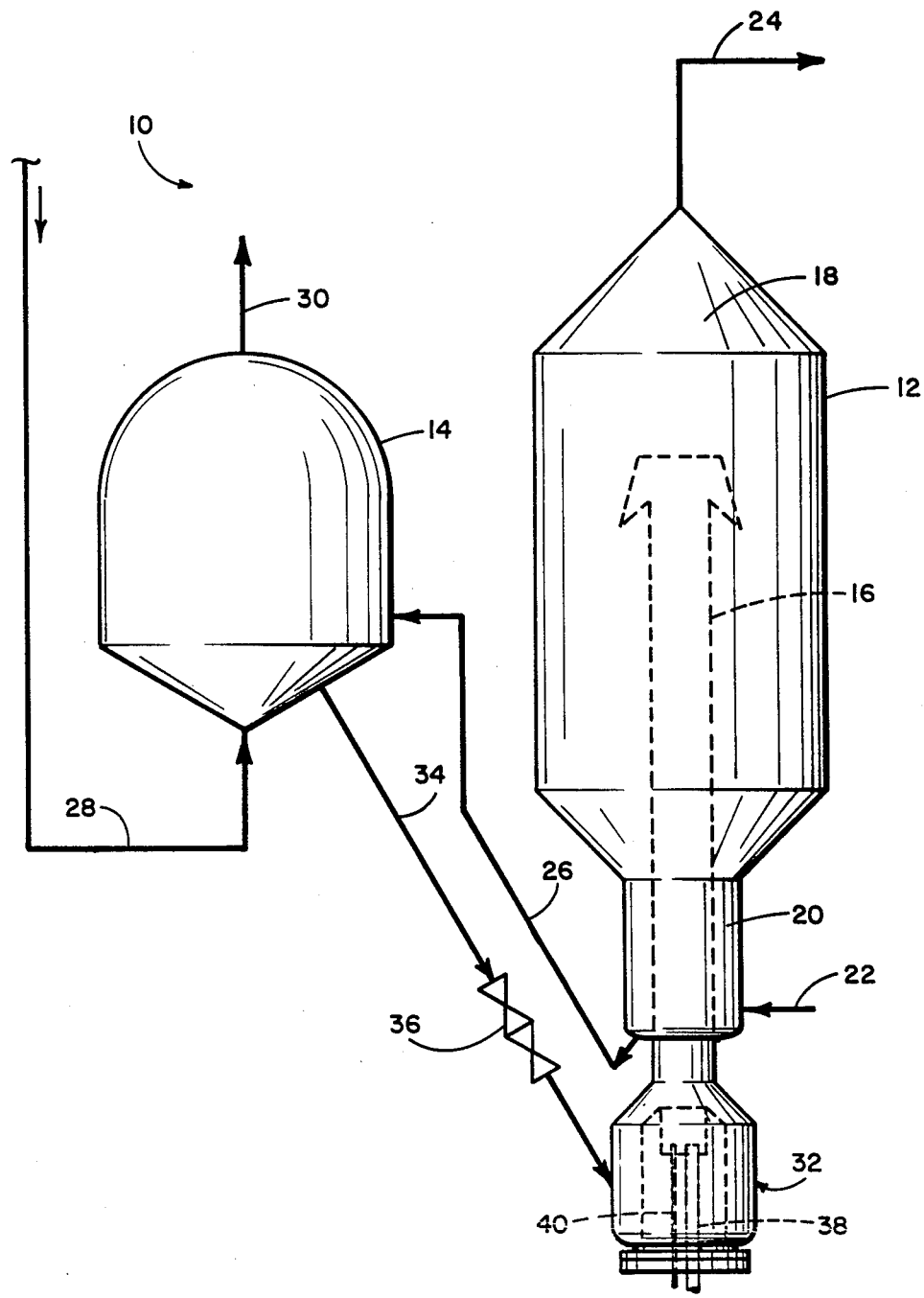
FIG. 1 schematically illustrates a catalytic cracking unit in combination with apparatus constructed in accordance with the instant invention.

Turning now to FIG. 1, indicated generally at 10 is a fluid catalytic cracking unit (FCCU) suitable for use with the instant invention. It should be appreciated that the invention may be used with other types of reactors as well. Included in FCCU 10 is a reactor 12 and a regenerator 14. Reactor 12 comprises a transfer line reactor or riser reactor 16, such being received within and coaxial with reactor 12. The reactor includes a catalyst/product separation zone 18 which usually contains several cyclone separators (not shown). A stripping section or zone 20 is provided for stripping entrained hydrocarbon from the coked catalyst under action of gas, usually steam, introduced to reactor 12 via line 22. It should be appreciated that the invention has applicability to transfer line reactors oriented other than vertically.

The separated product is conveyed via line 24 to a conventional separating tank and associated equipment.

After being stripped in zone 20, the cracking catalyst is conveyed from zone 20 to regenerator 14 in line 26 for coke burnoff. In the regenerator, oxygen-containing gas, such as heated air, is introduced through a line 28. Coke deposits are burned from the catalyst in regenerator 14 which forms an effluent gas that is separated from the catalyst in regenerator 14 which usually contains a plurality of cyclone separators (not shown). These flue gases are withdrawn from the regenerator through line 30. Hot regenerated catalyst passes from regenerator 14 to the lower end of riser reactor 16 through a line 34 which, in the instant embodiment, empties into a lift pot 32 in the lower end of riser reactor 16. The catalyst flow rate through the cracking unit is controlled by valves 36 which are positioned in line 34, preferably in a vertical portion thereof.

At the lower end of the riser, catalyst from line 34 is mixed with a hydrocarbon atomized component which can be introduced into the lift pot via central pipe 38 and with a hydrocarbon vapor component which can be introduced into lift pot 32 through pipe 40.

The operating conditions for riser reactor 16 and regenerator 14 can be conventional. Usually, the temperature in riser reactor 16 will be in the range of from about 850° to about 1050° F. The oil is usually admixed with steam at a weight ratio of oil to steam in the range of from about 6:1 to about 25:1. A catalyst-oil weight ratio employed in riser reactor 16 is generally in the range of from about 1:1 to about 30:1, usually between about 2:1 and about 15:1. Pressure in the riser reactor is usually between about 15 and about 60 psia (pounds per square inch absolute). The cracking catalyst particles generally have a size in the range of from about 20 to about 200 microns, usually between about 40 and 80 microns. Flow velocity upward in the vertical section of the riser reactor is generally from about 10 to 30 feet per second in the lower portions and up to between about 40 and about 120 feet per second in the upper portions. The contact time between the catalyst and oil in the riser reactor is generally in the range of from about 1 to about 4 seconds, usually from 1.5 to about 3 seconds where the oil is injected into the bottom of the riser. The regenerator is operated at a temperature typically in the range of from about 1100° to about 1500° F. and is ordinarily provided with sufficient oxygen-containing gas to reduce the coke on the catalyst to a level of about 0.5 weight percent or less, perferably less than 0.1 weight percent.

Catalysts suitable for catalytic cracking includes silica alumina or silica magnesia synthetic microspheres or ground gels and various natural clay-type or synthetic gel-type catalysts. Most preferably, fluidizable zeolite-containing cracking catalysts are employed. Such catalysts generally contain from about 2 to about 20 percent based on total weight of zeolitic material, such as Y-zeolite, dispersed in a silica alumina matrix and have an equilibrium B.E.T. surface area in the range of 22-250 $m^2/g$ and a particle size chiefly in the range of 40 to 80 microns.

Figure 2:
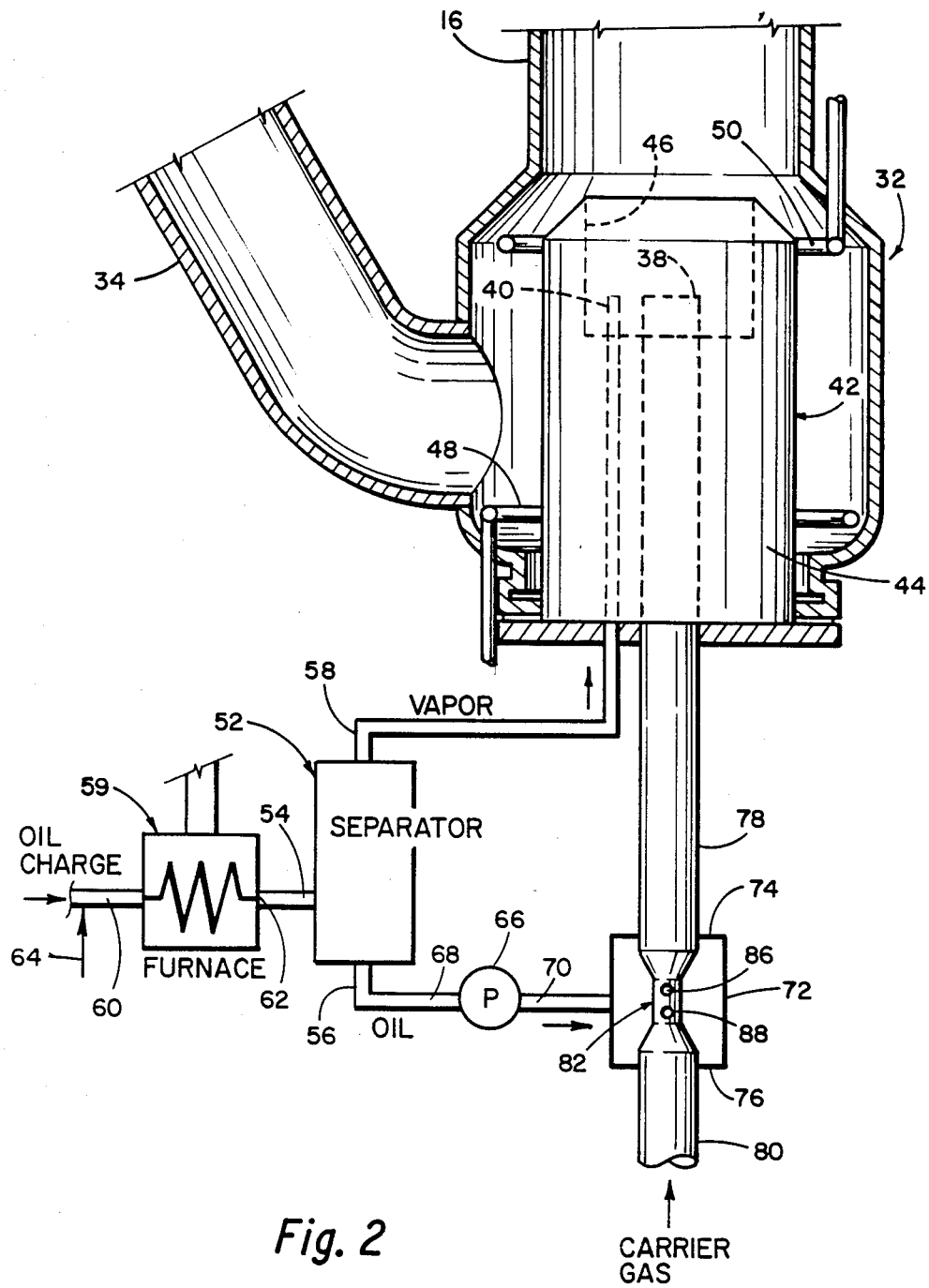
FIG. 2 is an enlarged view of a portion of FIG. 1 showing additional structure constructed in accordance with the instant invention.

Directing attention now to FIG. 2, consideration will be given to one manner in which atomized oil and oil vapor can be provided to the lower end of riser reactor 16. Lift pot 32 includes therein a nozzle cartridge assembly 42 into which central pipe 38 and pipe 40 are received. Cartridge assembly 42 is also referred to herein as means for introducing an atomized liquid stream and a vapor stream into a reactor for catalytic conversion. It should be noted that a suitable nozzle cartridge assembly 42 and lift pot 32 may be constructed in accordance with the disclosure, which is incorporated herein by reference, in U.S. Pat. No. 4,562,046 to Hayes et al. for a catalytic cracking unit using certain modifications disclosed herein. Generally speaking, cartridge assembly 42 includes a tubular member 44 having a generally cylindrical atomization chamber 46 formed therein. Central pipe 38, tubular member 44, and atomization chamber 46 are preferable all coaxial. Pipe 40 and central pipe 38 each extend into atomization chamber 46, the upper portion of which is open and in communication with the interior of lift pot 32 and the remainder of riser 16.

Preferably, atomized oil and oil vapor from pipes 38, 40, respectively, are mixed with fluidized cracking catalyst from line 34. To assist catalyst aeration or fluidization, a steam ring 48 is positioned in lift pot 32 for distributing a fluidizing gas such as steam into the lift pot.

A steam sparger 48 preferably distributes fluidizing gas in the lower portion of the lift pot to move catalyst vertically upward. A second steam sparger 50 for distributing a fluidizing gas such as steam may be positioned at the upper end of the lift pot as shown in the drawing. Usually steam spargers 48, 50 each are formed of an annular distributor having a side wall with a plurality of ports therethrough which connect its interior with circumferentially spaced apart positions in the lift pot. The ports through the side wall of the annular distributor constituting steam sparger 48 can be oriented downwardly or upwardly to lift the catalyst introduced into the catalyst lift chamber to the annular distributor constituting steam sparger 50. The ports through the side wall of steam sparger 50 will generally be oriented toward the upper end of the riser reactor. In this manner the cracking catalyst can be conveyed in dilute phase at a desired velocity upward into riser reactor 16.

A separator 52, such also being referred to herein as means for separating an oil feedstock stream into a vapor component and a liquid component, includes input means such as a conduit 54, liquid output means such as a conduit 56, and a vapor output means such as a conduit 58. Separator 52 can be conventional in structure and operation and receives a two phase flow in input 54, in the instant case such being an oil feedstock stream, and separates the input stream into a vapor component or stream, which is emitted from the separator via conduit 58, and a liquid component or stream, which is emitted from separator 52 via conduit 56. A heater or furnace 59 has input means 60 and output 62 and serves to heat fluid which is introduced into the furnace via input means 60 with the heated fluid being provided through output means 62. Furnace output 62 is in fluid communication with conduit 54. A source (not shown) of oil feedstock is supplied to input means 60 and furnace 59. In addition, a source (also not shown) of steam is preferably introduced and steam is mixed with hydrocarbon feedstock via line 64 prior to introduction of the feedstock into the furnace, line 64 also being referred to herein as means for mixing steam with said feedstock stream.

In one embodiment of the invention, a first means forming a flow path from liquid output means 56 to the outlet of pipe 38 may include a centrifugal pump 66 having an inlet 68 and an outlet 70. Inlet 68 is in fluid communication with liquid output means 56 of separator 52 and outlet 70 is in fluid communication with pipe 38, preferably via a manifold means which may include a cylindrical chest 72. Chest 72 includes an upper end 74 and a lower end 76 each of which receives therethrough a pipe 78, 80, respectively. A fluid-tight seal is formed between each of ends 74, 76 and its associated pipe.

A mixing section comprising atomizing means such as venturi nozzle 82 is received within chest 72 and has input means in communication with pipe 80 and output means in communication with pipe 78 for accommodating a stream of carrier gas flow therethrough. The mixing section is generally formed from a tubular member having an opening, for example a pair of bores 86, 88, through the side wall thereby placing the interior of chest 72 in fluid communication with pipe 78. An annular cavity is formed between the chest and the mixing section which preferably includes a central narrow portion in which, in the instant embodiment of the invention, bores 86, 88 are formed. A source (not shown) of carrier gas, for example steam, $H_2$, residue gas, or the like is provided to pipe 80. Thus, the carrier gas flows into pipe 80, through the venturi nozzle, into pipe 78, and out of central pipe 38 into atomizing chamber 46 and riser reactor 16.

In operation, the feedstock stream is supplied to input means 60 of furnace 59, preferably in admixture with steam from line 64, which heats the mixture and provides the heated mixture to conduit 54 of separator 52. Steam is preferably added to the feedstock stream to help prevent internal tubes in the furnace from coking. The fluid output of the furnace is a two-phase mixture consisting of oil vapor generated as a result of the furnace heat and steam, which comprise the gas phase, and liquid oil, which comprises the liquid phase.

Separator 52 separates the two-phase mixture into a gas phase, consisting of oil vapor and steam, and a liquid phase, consisting of liquid oil, with the gas phase being supplied to pipe 40. The liquid phase is pressurized via pump 66 and is provided to the interior of chest 72. Pump 66 overcomes the pressure drop generated by nozzle 82. Atomized oil thus leaves nozzle 82 in pipes 78, 38 with sufficient velocity to enter the FCCU for catalytic conversion. Carrier gas is supplied to pipe 80 at generally near sonic velocity. The size and rate of operation of pump 66 is selected so that the pressure in the cavity is greater than the pressure inside the venturi nozzle thereby forcing oil through bores 86, 88. The oil is atomized in pipe 78 under the action of the venturi nozzle. Pipe 78 may contain turbulance generating members if desired. Thus, atomized oil generally having a droplet size of 200 microns or less, preferably having a droplet size of predominantly, on a weight basis, 100 microns or less, is emitted from central pipe 38 and gas consisting of oil vapor and steam is emitted from pipe 40 into atomization chamber 46 and then upwardly in riser reactor 16 thereby mixing with catalyst which is supplied to lift pot 32 via line 34. Steam emitted from steam rings 48, 50, as has been previously described, mixes the catalyst with the vaporized oil and the mixture flows upwardly in riser reactor 16. Separated products are removed in the usual manner via line 24 and spent catalyst is transported to regenerator 14, as previously described, for regeneration.

It should be appreciated that chest 72, with venturi nozzle 82 received therein, may be received in tubular member 44 of cartridge assembly 42 without affecting operation of the fluid catalytic cracking unit described herein. Additions and modifications may be made to the instant embodiment of the invention without departing from the spirit thereof which is defined in the following claims.

I claim:

1. Apparatus for enhancing catalytic conversion of an oil feedstock stream in combination with a reactor, comprising:
   means for separating an oil feedstock stream into a vapor stream and a liquid stream;
   means in fluid communication with said separating means for atomizing said liquid stream prior to contact by said vapor stream in said reactor; and
   means in fluid communication with said atomizing means for introducing the separated streams into said reactor for catalytic conversion.

2. The apparatus of claim 1 wherein the oil feedstock stream is predominantly hydrocarbon and wherein said apparatus further comprises means for heating the hydrocarbon feedstock stream, said heating means being in fluid communication with said separating means upstream therefrom.

3. The apparatus of claim 2 wherein said apparatus further comprises means for mixing the hydrocarbon feedstock with steam, said mixing means being located upstream from said heating means and in fluid communication therewith.

4. The apparatus of claim 1 wherein said atomizing means comprises a venturi nozzle.

5. The apparatus of claim 4 wherein said apparatus further comprises a pump operatively connected to and in fluid communication with said venturi nozzle for supplying the liquid stream to the throat thereof.

6. The apparatus of claim 5 wherein said apparatus further comprises means for supplying a carrier gas to said venturi nozzle.

7. Apparatus for processing an oil feedstock stream prior to mixing the same with catalyst for catalytic conversion, said apparatus comprising:
   a reactor;
   a separator having input means, liquid output means, and a vapor output means, said separator being operable to receive an oil feedstock stream in said separator input means and separate the same into a liquid stream which is emitted from said liquid output means and a vapor stream which is emitted from said vapor output means;
   means operatively connected to and in fluid communication with said liquid output means for atomizing said liquid stream prior to contact with said vapor stream in said reactor; and
   means in fluid communication with said atomizing means for introducing said atomized liquid stream and said vapor stream into said reactor for catalytic conversion.

8. The apparatus of claim 7 wherein said apparatus further includes a pump having an inlet and an outlet, said inlet being operatively connected to said separator liquid output means and said outlet being operatively connected to said atomizing means.

9. The apparatus of claim 7 wherein said apparatus further includes a heater having input means and output means and being operable to receive said feedstock stream in said heater input means, heat the same, and emit the heated feedstock stream from said heater output means, said heater having the output means thereof operatively connected to said separator input means.

10. The apparatus of claim 9 wherein said apparatus further includes means for mixing steam with said feedstock stream, said mixing means being operatively connected to and in fluid communication with said heater input means thereby providing a mixture of steam and feedstock to said heater input means when said apparatus is in operative condition.

11. The apparatus of claim 7 wherein said atomizing means comprises a venturi nozzle.

12. The apparatus of claim 11 wherein said venturi nozzle includes input means and output means for accommodating a stream of carrier gas therethrough.

13. The apparatus of claim 12 wherein said venturi nozzle includes an opening in the throat thereof for receiving said liquid stream therethrough.

14. The apparatus of claim 13 wherein said apparatus further includes a cavity in which said venturi nozzle is received, said liquid stream being provided under pressure to said cavity when said apparatus is in operative condition.

15. Apparatus for enhancing conversion of a feedstock stream in combination with a reactor, comprising:
- means for separating a feedstock stream into a vapor stream and a liquid stream;
- means in fluid communication with said separating means for atomizing said liquid stream prior to contact by said vapor stream in said reactor; and
- means in fluid communication with said atomizing means for introducing the separated streams into said reactor for conversion.

16. The apparatus of claim 15 wherein said apparatus further comprises means for heating the feedstock stream, said heating means being in fluid communication with said separating means upstream therefrom.

17. The apparatus of claim 15 wherein said atomizing means comprises a venturi nozzle.

18. The apparatus of claim 17 wherein said apparatus further comprises a pump operatively connected to and in fluid communication with said venturi nozzle for supplying the liquid stream to the throat thereof.

19. The apparatus of claim 18 wherein said apparatus further comprises means for supplying a carrier gas to said venturi nozzle.

* * * * *

UNITED STATES PATENT AND TRADEMARK OFFICE
CERTIFICATE OF CORRECTION

PATENT NO. : 4,853,189

DATED : August 1, 1989

INVENTOR(S) : Floyd H. Holland

It is certified that error appears in the above-identified patent and that said Letters Patent is hereby corrected as shown below:

Column 4, line 27, delete "input" and substitute --conduit--.

Column 4, line 32, after "output", add --means--.

Signed and Sealed this

Nineteenth Day of June, 1990

Attest:

HARRY F. MANBECK, JR.

*Attesting Officer*  *Commissioner of Patents and Trademarks*